United States Patent [19]

Soper

[11] E Re. 31,227

[45] Reissued May 3, 1983

[54] 4-TRIFLUOROMETHYL-2,6-DINITROANILINES

[75] Inventor: Quentin F. Soper, Indianapolis, Ind.

[73] Assignee: Eli Lilly and Company, Indianapolis, Ind.

[21] Appl. No.: 877,930

[22] Filed: Feb. 15, 1978

Related U.S. Patent Documents

Reissue of:

[64] Patent No.: 3,403,180
Issued: Sep. 24, 1968
Appl. No.: 587,699
Filed: Oct. 19, 1966

U.S. Applications:

[63] Continuation-in-part of Ser. No. 314,510, Oct. 7, 1963, Pat. No. 3,332,769, and Ser. No. 485,060, Sep. 3, 1965, abandoned, which is a continuation-in-part of Ser. No. 243,631, Dec. 10, 1962, Pat. No. 3,257,190, which is a continuation-in-part of Ser. No. 53,066, Aug. 31, 1960, abandoned.

[51] Int. Cl.[3] ..... C07C 87/60; E05B 63/14
[52] U.S. Cl. ..... 564/441; 71/121
[58] Field of Search ..... 260/577; 71/121; 564/441

[56] References Cited

U.S. PATENT DOCUMENTS 2,212,825 8/1940 Daudt et al. ..... 260/571
3,111,403 11/1963 Soper ..... 71/2.3
3,257,190 6/1966 Soper ..... 260/577 X
3,332,769 7/1967 Soper ..... 260/577 X

FOREIGN PATENT DOCUMENTS 1298717 6/1962 France ..... 260/577

OTHER PUBLICATIONS

Technical Information Lilly 31864, Sep. 10, 1960.
Alder et al., "Proceedings North Central Weed Control Conference", pp. 23–24, Dec. 12–14, 1960.
Alder et al., "Northeastern Weed Control Conference", pp. 298–302, Jan. 4–6, 1961.
Soper et al., "Proceedings 14th Annual Meeting of the Southern Weed Conference", pp. 86–90, Jan. 18–20, 1961.
Technical Information on Trifluralin and Dipropalin.
Technical Report on Trifluralin, Dec. 1, 1961.
Technical Report on Dipropalin, Dec. 1, 1961.
Klingman, "Weed Control: As a Science", pp. 222–223 (1961).

*Primary Examiner*—John Doll
*Attorney, Agent, or Firm*—Leroy Whitaker; Arthur R. Whale

[57] ABSTRACT

This invention relates to a group of novel substituent anilines, useful in eliminating germinating and seedling weed grasses and selected broadleaf weeds.

2 Claims, No Drawings

4-TRIFLUOROMETHYL-2,6-DINITROANILINES

Matter enclosed in heavy brackets [ ] appears in the original patent but forms no part of this reissue specification; matter printed in italics indicates the additions made by reissue.

Cross references to related applications

The present application is a continuation-in-part application of two copending parent applications: Ser. No. 314,510, filed Oct. 7, 1963 (now Patent No. 3,332,769, issued July 25, 1967); and Ser. No. 485,060, filed Sept. 3, 1965.

The latter application, later abandoned, was itself a continuation-in-part application of prior copending application, Ser. No. 243,631, filed Dec. 10, 1962 (now Patent No. 3,257,190, issued June 21, 1966), which was, in turn, a continuation-in-part of a yet earlier copending application, Ser. No. 53,066, filed Aug. 31, 1960, and abandoned after the filing of Ser. No. 243,631.

The novel compounds provided by this invention are represented by the following formula:

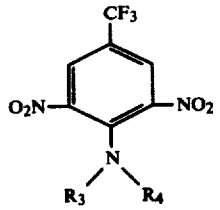

wherein $R_3$ is $C_2$–$C_4$ alkyl, allyl, or hydrogen; $R_4$ is methyl, ethy, n-propyl, n-butyl, iso-butyl or allyl when $R_3$ is either $C_2$–$C_4$ alkyl or allyl; and $R_4$ is 2-pentyl or 3-pentyl when $R_3$ is hydrogen; the sum of the carbon atoms in the groups represented by the $R_3$ and $R_4$ being greater than 3.

In the above formula, when $R_3$ is $C_2$–$C_4$ alkyl, it represents ethyl, n-propyl, n-butyl, iso-butyl and the like.

Detailed description of the invention

Illustrative compounds coming within the scope of the above formula include:

N-methyl-N-iso-butyl-4-trifluoromethyl-2,6-dinitroaniline

N-ethyl-N-iso-butyl-4-trifluoromethyl-2,6-dinitroaniline

N-n-butyl-N-n-propyl-4-trifluoromethyl-2,6-dinitroaniline

N-methyl-N-n-propyl-4-trifluoromethyl-2,6-dinitroaniline

N-methyl-N-allyl-4-trifluoromethyl-2,6-dinitroaniline

N,N-di-n-butyl-4-trifluoromethyl-2,6-dinitroaniline

N-allyl-N-ethyl-4-trifluoromethyl-2,6-dinitroaniline

The compounds of this invention are useful in that they selectively kill germinating and seedling weed grasses and germinating and seedling broadleaf weeds without damaging crop plants at any stage of growth whether as germinating, seedling, or mature plants. They can thus be employed as herbicides pre-emergent with respect to both weeds and crops. Because of their lack of post-emergent herbicidal effect on crops, however, they are particularly useful in that they can be applied as pre-emergent weedicides to areas in which the crop plant is already growing; i.e., pre-emergent to the weeds, but post-emergent to the crops.

Compounds represented by the above formulas have an unexpectedly greater herbicidal activity against germinating and seedling weed grasses and against a variety of broadleaf weeds in any stage of growth than do compounds containing hydrogen or another substitutent in the para position of the aniline ring.

The compounds of this invention are employed as selective pre-emergent herbicides by applying them to areas infested with seedling or germinating weed grasses or seedling or germinating broadleaf weeds either as a spray, made up by adding water to an emulsifiable concentrate or wettable powder, or as a solid dispersion, using a carrier such as attapulgite clay granules, peat moss, fertilizer, vermiculite, or the like. The compounds are quite insoluble in water, and hence, for the preparation of emulsions or wettable powders, the compounds are preferably formulated with wetting agents.

Herbicidal formulations containing a compound represented by the above formulas as the active ingredient are useful in eliminating seedling or germinating weed grasses and a variety of broadleaf weeds in early stages of growth from such areas as gravel walks, shoulders of roads, fence rows, clay tennis courts, flower gardens, drainage ditches, woodland areas, and the like. The compounds can also be applied for the same purpose to crop-growing areas either in-row before or at planting time or between rows of crops.

It is a considerable advantage of this invention that the N-substituted-4-trifluoromethyl-2,6-dinitroanilines as defined above do not affect the growth of crop plants either in the seedling or mature stages of growth or the growth of established turfs at concentrations which virtually eliminate germinating and seedling grasses and many germinating and seedling broadleaf weeds from areas infested therewith. Thus, compounds of this invention can be applied as pre-emergent weedicides to areas in which crops are either in the pre- or post-emergent stage of growth. Among the crop plants which will tolerate concentrations of an N-substituted-4-trifluoromethyl-2,6-dinitroaniline sufficient to kill germinating and seedling grasses and broadleaf weeds are the following: cotton, soybeans, tobacco, tomatoes, collards, great northern beans, kidney beans, navy beans, cowpeas, safflower, transplant peppers, peanuts, snapbeans, cauliflower, watermelon, brussels sprouts, cabbage, kale, asparagus, vetch, white potatoes, lettuce, carrots, rutabaga, lima beans, green peas, alfalfa, lespedeza, cucumbers, muskmelons, parsnips, okra, broccoli, sunflowers, pumpkins, radishes, sweet potatoes, peppermint, flax, and related species.

Because of the highly specific action of the compounds of the present invention, they can also be used safely to treat fields containing established crop plants which belong to the grass family. They can thus be applied to stands of mature monocotyledonous plants such as sweet corn, field corn, barley, wheat, rye, Japanese millet, German millet, bluegrass, sorghum, and the like in order to eliminate germinating and seedling grasses and germinating and seedling broadleaf weeds therefrom.

As previously stated, formulations of the compositions of the present invention can be applied to a crop area for the desired purpose in a variety of ways; e.g., by hand or broadcast treatment, either at the time of planting, or after the crop has passed the seedling stage of growth, as a lay-by treatment. It is also possible to apply compositions utilizing the compounds of this invention as pre-emergent herbicides between rows of established plants which are themselves quite susceptible to the herbicidal action of the compounds. The type of treatment chosen depends upon cost and upon the type of damage to the plant to be expected from an overdose of the herbicide, as well as upon other factors. Whenever possible, the herbicide should be incorporated into the soil, since such soil incorporation greatly increases the effectiveness and length of action of the herbicide.

Herbicidal compositions containing a compound coming within the scope of the above formulas as its active ingredient can be employed to eliminate grasses such as the following in the germinating or the seedling stage of growth from an area infested therewith: Undesirable grasses such as the crabgrasses (Digitaria sanguinalis and Digitaria ischaemum), green and yellow foxtails (Setaria viridis and Setaria glauca), Johnson grass (Sorghum halepense), goosegrass (Eleusine indicia), sandbur (Cenchrus pauciflorus), witchgrass (Pancium capillare) and the like; as well as the seedlings of desirable grasses such as oats (Avena sativa), Bermuda grass (Cynodon dactylon), Kentucky bluegrass (Poa pratensis), bentgrass (Agrostis tenuis), fescues (Festuca sp.), orchard grass (Dactylis glomerata), red top (Agrostis alba), sorghum (Sorghum vulgare), German millet (Setaria italica), Japanese millet (Echinochloa crusgalli var. frumentacea) and the like. Among the broadleaf weeds which can be eliminated by an application to an area infested with weed seeds of a compound coming within the scope of the above formulas are included particularly members of the genus Amaranthus such as pigweed; the genus Polygonum such as smartweed; the genus Chenopodium such as lambsquarter; the genus Stellaria such as chickweed; the genus Mollugo such as carpetweed; the genus Salsola such as Russian thistle; as well as members of the genera Kochia and Portulaca.

In addition to their use as herbicides in crop-growing areas, along road sides and gravel walks, etc., the novel compounds of the present invention can be suitably formulated for use to eliminate germinating and seedling weed grasses, particularly crabgrass and foxtail, from established lawns containing desirable grasses such as bluegrass, zoysia, St. Augustine grass, bentgrass, fescue, and Bermuda grass. As with the monocotyledonous crop plants, the relatively great susceptibility of grasses in the germinating or seedling stages of growth to the herbicidal effects of the N-substituted-4-trifluoromethyl-2,6-dinitroanilines permits the use of these compounds to eliminate weed grasses from areas where a desirable grass is already established.

Herbicidal compositions containing an effective amount of a compound of this invention are applied to those areas wherein it is desired to eliminate seedling grass weeds and broadleaf plants at rates varying from around 0.1 to 20 lb. per acre, depending upon the nature of the area itself, including such factors as the crop, the weeds or broadleaf plants, their state of growth, the type of soil and its content of organic matter—sand, and clay, and the like. For example, large amounts of even the most active herbicidal N-substituted-4-trifluoromethyl-2,6-dinitroaniline can be applied to driveways, roadsides, etc., since there is no liklihood that an overdose might harm desirable plants. In addition, many turfs, particularly those of tall fescue and Bermuda grass, are very resistant to high concentrations of even the most active of the compounds of the present invention. In other situations, however, where an excess of the compound would deleteriously affect the growth of desirable plants, it is necessary to choose an application rate for the herbicidal compound which will not damage the seedling or mature crop plant or grass turf and to apply the compound at the particular chosen dosage. For most of the compounds and for most crop plants, there is a considerable safety factor present between that dosage which will virtually eliminate seedling weed grasses and that dosage which will do even minimal damage to the crop plants or established grasses present in the same area.

Extensive tests have shown that one of the compounds most active in killing germinating and seedling weed grasses and broadleaf weeds is an N,N-di-n-propyl-4-trifluoromethyl-2,6-dinitroaniline, to be referred to hereinafter by its generic name, trifluralin. In the greenhouse, trifluralin eliminates in excess of 80 percent of seedling weed grasses and broadleaf weeds, such as pigweed, in the seedling stage of growth at application rates of about 0.5 lb. per acre. There is, on the other hand, no appreciable damage to established plants except crabgrass at application rates as high as 8 lb. per acre. In the field, trifluralin can, when applied at rates of 1 to 16 lb. per acre by spraying and at rates of from 0.25 to 5 lb. per acre by soil incorporation, successfully inhibit the growth of weed grasses and broadleaf weeds in the seedling or germinating stages of growth. The application rate depends on the type of soil to be treated, sandy soils requiring less herbicide, and heavy clay soils, relatively more herbicide. At rates up to 8 lbs. per acre, very few broadleaf plant species in mature stages of growth are damaged by the application of trifluralin.

Trifluralin has also been used for the selective pre-emergent control of seedling grass weeds and selected broadleaf weeds in ornamental flower beds, around shrubs and trees, in rose gardens, and in ground covers. It can be applied at rates sufficiently high to control weed population without damage to the established plants. Among the broadleaf weeds which have been controlled under these conditions are the following: carpetweed, chickweed, lambs-quarter, pigweed, purslane, knotweed, and smartweed. In such experiments, trifluralin was applied at rates in the range of 1 to 5 pounds per acre. At the latter level, the amount of trifluralin applied was greatly in excess of that needed for immediate control of crabgrass in the particular area, but the added amount provided full-season protection against seedling grasses in all soil types. There was no damage to a wide variety of ornamental shrubs, trees, bulbs, flowering plants, and ground cover at the given application rates.

Trifluralin has also been extensively tested in the field for its ability to control grass weeds in soybean fields. For this purpose, it was applied as a liquid formulation at rates varying from 0.5 to 1.5 lbs. per acre as pre-plant soil-incorporation treatment. When applied in this way, trifluralin eliminated from 93–99+ percent of the grass weeds, from 56–96 percent of pigweed and smartweed, and from 38–78 percent of ragweed seeded to the area at the same time as the soybeans. No damage to the soybeans was seen. Essentially the same results were obtained when trifluralin was applied to the test area as a solid formulation (for example, a 2.5 percent formulation on diatomaceous earth). In another field trial, this time with trifluralin alone, incorporation of the compound into the soil at the time of planting of the soybeans, after application to the area by spraying at rates varying from 0.5 to 4 lbs. per acre, gave 100 percent control of crabgrass in most test plots at all application rates, and the same for pigweed. The control of purslane, another broadleaf weed, was in excess of 90 percent on the average.

Seedling grasses and susceptible broadleaf weeds can also be controlled in cotton fields by the application thereto of trifluralin as a pre-emergent herbicide at the following rates, applied either in-row or broadcast, and incorporated into the soil; 0.5 lb. per acre on sand, 0.75 lb. per acre on loam, and 1.0–1.5 lbs. per acre on silty clay loam or clay soil. In numerous field trails using trifluralin at the recommended rates of application, the control of grass weeds varied from 92–100 percent and the control of broadleaf weeds from 60–100 percent without any perceptible damage to the cotton crop. Trifluralin can also be applied post-emergent to cotton as a lay-by treatment.

Another outstanding composition of the present invention is N-n-butyl-N-ethyl-4-trifluoromethyl-2,6-dinitroaniline, which will be referred to hereinafter by its generic name, benefin.

Benefin has been extensively employed as a pre-emergent herbicide in lawns throughout the different climatic areas of the United States. When applied at the rate of 1.5 to 2.0 lbs. per acre as a dry, spreadable formulation on a vermiculite or fertilizer carrier, containing from 0.3 to 2 percent active compound by weight, benefin was found to kill completely the following germinating and seedling grasses: goosegrass, barnyard grass, large crabgrass, smooth crabgrass, foxtail, and annual bluegrass. Benefin can be applied to an established bluegrass lawn anytime in the spring, and when thus applied, will kill germinating weed grass seeds or seedling grasses as long as the compound persists in the upper soil layer in a herbicidal concentration which is usually for the duration of the weed grass growing season.

The lack of toxicity of benefin for turfs was established by the application of the compound to Bermuda grass turfs and Kentucky bluegrass turfs at rates as high as 6 lbs. per acre under favorable weather conditions without producing any perceptible damage to the turf. Benefin has also been used effectively on other turfs, including zoysia, St. Augustine grass, and Merion bluegrass.

Benefin has also been used successfully for the control of seedling grasses and of broadleaf weeds in peanut fields. With soil incorporation of benefin to the area to be planted in peanuts, using a disc, rotovator, or power-driven rotary hoe as the incorporation tool, the indicated rate of application is 0.75 lb. per acre on sandy or loamy soil and 0.75 to 1.5 lbs. per acre on silty clay or clay soil. At these rates of application, there was little or no damage to the peanut plants, while the control of grass seedlings and susceptible broadleaf weeds varied from 99–100 percent and 90–100 percent, respectively.

In addition, benefin has been used successfully to control weeds in tobacco plantings. The compound can be applied to the soil during the transplanting of tobacco seedlings. The rates of application are essentially the same as those indicated above for peanuts.

A third compound, N-(3-pentyl)-4-trifluoromethyl-2,6-dinitroaniline, is also a very effective pre-emergent weedicide and will virtually eliminate seedling weed grasses from snapbean fields when applied at a rate which is one-fourth or less than that of the application rate which is toxic to snapbeans.

The compounds of the present invention can be formulated in a variety of ways for application of soil areas. Among the suitable formulations are included wettable powders, emulsifible concentrates, and solid powdery or granular preparations on selected carriers. The formulations can also include other herbicides (for killing mature grasses and dicotyledonous plants), insecticides, miticides, etc. Typical formulations are set forth below.

FORMULATION 1

Solid formulation on vermiculite

The following ingredients were dissolved in an aromatic naphtha solvent extended with mineral spirits and the solution was applied to vermiculite so as to give a formulation having the following percentages of active ingredients by weight:

| | Percent |
|---|---|
| Trifluralin | 0.29 |
| 2,4-dichlorophenoxyacetic acid, iso-octyl ester | 1.4 |
| 2,4,5-trichlorophenoxyacetic acid, iso-octyl ester | 0.67 |

Sufficient disodium methylarsonate hexahydrate dust was blended with the vermiculite to give a concentration of 4 percent.

FORMULATION 2

Solid formulation on fertilizer

The following active ingredients were dissolved in an aromatic naphtha solvent and deposited upon a 4–12–4 fertilizer to give a dry spreadable formulation having the following composition in percentage by weight:

| | Percent |
|---|---|
| Trifluralin | 0.184 |
| Heptachlor and related compounds | 0.125 |

N-(3-pentyl)-4-trifluoromethyl-2,6-dinitroaniline can replace trifluralin in the above composition.

FORMULATION 3

Spreadable formulation on lawn-type fertilizer

The following ingredients were dissolved in an aromatic naphtha solvent and deposited on a 10–5–5 fertilizer to give a spreadable formulation having the following composition in percentage by weight:

| | Percent |
|---|---|
| Trifluralin | 0.092 |
| Heptachlor and related compounds | 0.59 |

In addition, sufficient diphenylacetonitrile (another pre-emergent herbicide) was melted on the fertilizer to give a final concentration of 4.6 percent.

FORMULATION 4

Solution concentrate

A solution concentrate was prepared containing the following active ingredients in percentages by weight:

| | Percent |
|---|---|
| Trifluralin | 1.54 |
| Disodium methylarsonate hexahydrate | 4.5 |
| 2,4-dichlorophenoxyacetic acid, iso-octyl ester | 1.74 |
| 2,4,5-trichlorophenoxyacetic acid, iso-octyl ester | 0.55 |

A nonylphenoxy polyoxyethylene ethanor, 4.2%, was added as an emulsifier. The recommended rate of dilution for this product is four tablespoons to one gallon of water.

Other typical formulations are listed below in terms of total content of active and inert ingredients.

| | | Percent |
|---|---|---|
| | (A) Granular formulations | |
| (1) | Trifluralin | 1-5 |
| | Xylene solvent | 1-3 |
| | Emulsifier | 3-4 |
| | Diatomaceous earth granules | 88-95 |
| (2) | Benefin | 1-5 |
| | Xylene solvent | 1-3 |
| | Emulsifier | 3-4 |
| | Diatomaceous earth granules | 88-95 |
| (3) | Trifluralin | 5.0 |
| | Methylated naphthalene solvent | 6.0 |
| | Attapulgite clay granules | 89.0 |
| (4) | Trifluralin | 1.0-2.0 |
| | Aromatic naphtha solvent | 1.0-3.0 |
| | No. 4 vermiculite | 95.0-98.0 |
| (5) | Trifluralin | 0.5 |
| | Aromatic naphtha solvent | 4.5 |
| | Granular diatomaceous earth | 95.0 |
| (6) | Trifluralin | 1.0-2.0 |
| | Aromatic naphtha solvent | 0.5-3.5 |
| | Corncob grit | 94.5-98.5 |
| (7) | N—(3-pentyl)-4-trifluoromethyl-2,6-dinitroaniline | 1.0 |
| | Aromatic petroleum distillate | 4.0 |
| | No. 4 vermiculite | 95.0 |
| (8) | N—(3-pentyl)-4-trifluoromethyl-2,6-dinitroaniline | 5.0 |
| | Aromatic petroleum distillate | 6.0 |
| | Diatomaceous earth | 89.0 |
| (9) | N—(3-pentyl)-4-trifluoromethyl-2,6-dinitroaniline | 5.0 |
| | Aromatic petroleum distillate | 4.0 |
| | Ethylene oxide adduct of nonylphenol | 7.5 |
| | Granular clay | 83.5 |
| (10) | N—(3-pentyl)-4-trifluoromethyl-2,6-dinitroaniline | 2.0 |
| | Aromatic petroleum distillate | 3.5 |
| | Corn cob grit | 94.5 |
| | (B) Liquid concentrate formulations | |
| (1) | Trifluralin | 35.0-37.5 |
| | Emulsifier | 2.5-5.0 |
| | Xylene solvent | 57.0-61.5 |
| (2) | Trifluralin | 46.0-49.0 |
| | Emulsifier | 3.5-5.0 |
| | Xylene solvent | 46.0-49.5 |
| (3) | Trifluralin (60-69% solution) in aromatic naphtha solvent | 69.0-75.0 |
| | Emulsifier | 7.0 |
| | Xylene solvent | 18.5-25.0 |
| (4) | Benefin | 19.0-22.0 |
| | Emulsifier | 2-6 |
| | Xylene solvent | 72-79 |
| (5) | N—(3-pentyl)-4-trifluoromethyl-2,6-dinitroaniline | 46-49 |
| | Emulsifier | 5 |
| | Xylene range solvent | 46-49 |
| (6) | N—(3-pentyl)-4-trifluoromethyl-2,6-dinitroaniline | 43-46 |
| | Emulsifier | 7 |
| | Heavy aromatic naphtha | 47-50 |
| | (C) Water dispersible dry powder | |
| (1) | N—(3-pentyl)-4-trifluoromethyl-2,6-dinitroaniline | 20 |

-continued

| | Percent |
|---|---|
| Ethylene oxide adduct of octylphenol | 2 |
| Lignin sulfonate | 2 |
| Hydrated silica | 76 |

In the above liquid formulations, the emulsifier can be any suitable anionic or non-ionic surfactant or a mixture of these two types of surfactants. Typical of the latter are blends containing three parts of the calcium salt of myristylbenzenesulfonic acid to one part of the oleate ester of a polyoxyethylene glycol (M.W.=350) or seven parts of the calcium salt of laurylphenolsulfonic acid to three parts of mono- and di-resin acid esters of polyoxyethylene glycol (M.W.=500). Other non-ionic surfactants which are commonly blended with the anionic surfactants listed above include polyoxyethylene sorbitan monolaurate. A particularly useful emulsifier combination for use in the liquid formulation No. 3 above includes 2.1% of an alkylarylsulfonate and 4.9% of an anionic nonionic surfactant mixture containing a magnesium salt of a cetylphenolsulfonic acid and a mono- and di-resin acid ester of a polyoxyethylene glycol (M.W.=400). Other suitable emulsifiers will readily suggest themselves to those skilled in the art.

The N-substituted-4-trifluoromethyl-2,6-dinitroanilines provided by this invention are either low-melting, yellow, crystalline solids or heavy, orange-colored, viscous oils. They are readily prepared by heating 4-trifluoromethyl-2,6-dinitrochlorobenzene with a primary or secondary amine in an inert solvent. For example, N,N-di-n-propyl-4-trifluoromethyl-2,6-dinitroaniline is prepared by reacting 4-trifluoromethyl-2,6-dinitrochlorobenzene with an excess of di-n-propylamine in a suitable nonreacting solvent such as benzene or ethanol. Hydrogen chloride produced as a by-product in the reaction is immediately picked up by the excess di-n-propylamine present, thus forming di-n-propylamine hydrochloride. If a nonpolar organic solvent such as benzene is used in which the hydrochloride salt is insoluble, the salt can be separated by filtration and the desired N,N-di-n-propyl-4-trifluoromethyl-2,6-dinitroaniline recovered by evaporation of the filtrate. If a polar organic solvent such as ethanol is used in which the hydrochloride salt is soluble, the reaction mixture is evaporated to dryness and the residue treated with a mixture of water and ether. The hydrochloride salt dissolves in the water and the N-N-di-n-propyl-4-trifluoromethyl-2,6-dinitroaniline is extracted into the ether layer and recovered by evaporation of the ether.

The following examples further exemplify the compounds of this invention and methods of preparing them:

EXAMPLE

Fifty grams of 4-chloro-3,5-dinitrobenzoic acid were reacted with 50 g. of sulfur tetrafluoride in an autoclave at 120° C. for 7 hours to form 4-trifluoromethyl-2,6-dinitrochlorobenzene. Evaporation of the reaction mixture to dryness left a solid residue comprising 4-trifluoromethyl-2,6-dinitrochlorobenzene, which was purified by recrystallization from a hexane-benzene solvent mixture. Crystalline 4-trifluoromethyl-2,6-dinitrochlorobenzene thus prepared melted at about 53°-57° C.

Analysis.—Calc.: N, 10.35. Found: N, 9.90.

Eight and one-tenth grams of 4-trifluoromethyl-2,6-dinitrochlorobenzene were mixed with 10 ml. of di-n-propylamine, and the reaction mixture was heated at about 100° C. for about 2 hours. The reaction mixture was diluted with ether and was filtered to remove di-n-propylamine hydrochloride formed as a by-product in the reaction. The filtrate was washed with dilute hydrochloric acid and then was evaporated to dryness in vacuo. The residue, containing N,N-di-n-propyl-4-trifluoromethyl-2,6-dinitroaniline, was recrystallized from hexane and melted at about 41°–43° C.

Analysis.—Calc.: C, 46.57; H, 4.81; N, 12.53. Found: C, 46.56; H, 4.9; N, 12.62.

The following compounds were prepared by the above procedure by substituting the appropriate amine for di-n-propylamine:

N,N-diethyl-4-trifluoromethyl-2,6-dinitroaniline, M.P.=93.5°–95° C.

Analysis.—Calc.: N, 13.68. Found: N, 13.77.

N,N-di-iso-butyl-4-trifluoromethyl-2,6-dinitroaniline, M.P.=71°–72° C.

Analysis.—Calc.: N, 11.57. Found: N, 11.36.

N-methyl-N-n-butyl-4-trifluoromethyl-2,6-dinitroaniline, M.P.=49°–51° C.

Analysis.—Calc.: N, 13.08. Found: N, 13.22.

N-ethyl-N-n-butyl-4-trifluoromethyl-2,6-dinitroaniline, M.P.=65°–66.5° C.

Analysis.—Calc.: N, 12.53. Found: N, 12.76.

N-ethyl-N-n-propyl-4-trifluoromethyl-2,6-dinitroaniline, M.P.=89°–91° C.

Analysis.—Calc.: N, 13.08. Found: N, 13.35.

N,N-diallyl-4-trifluoromethyl-2,6-dinitroaniline, M.P.=61°–62° C.

Analysis.—Calc.: N, 12.69. Found: N, 12.42.

N-(3-pentyl)-4-trifluoromethyl-2,6-dinitroaniline, M.P.=71°–73° C.

Analysis.—Calc.: N, 13.08. Found: N, 12.79.

N-(2-pentyl)-4-trifluoromethyl-2,6-dinitroaniline, M.P.=32°–34° C.

Analysis.—Calc.: N, 13.08. Found: N, 12.80.

I claim:

1. A compound represented by the following formula:

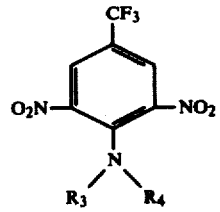

wherein $R_3$ is [$C_2$–$C_4$ alkyl, allyl, or hydrogen] *ethyl, n-propyl, n-butyl, or allyl*; $R_4$ is methyl, ethyl, n-propyl, n-butyl, [iso-butyl] or allyl [when $R_3$ is either $C_2$–$C_4$ alkyl or allyl; and $R_4$ is 2-pentyl or 3-pentyl when $R_3$ is hydrogen]; the sum of the carbon atoms in the groups represented by $R_3$ and $R_4$ being greater than 3.

2. A compound according to claim 1 wherein $R_3$ and $R_4$ are n-propyl.

[3. A compound according to claim 1 wherein $R_3$ is ethyl and $R_4$ is n-propyl.]

[4. A compound according to claim 1 wherein $R_3$ is -n-butyl and $R_4$ is ethyl.]

[5. A compound according to claim 1 wherein $R_3$ is n-butyl and $R_4$ is n-propyl.]

[6. A compound according to claim 1 wherein $R_3$ is hydrogen and $R_4$ is 3-pentyl.]

* * * * *